United States Patent [19]

Sinozaki

[11] Patent Number: 5,689,863
[45] Date of Patent: Nov. 25, 1997

[54] CLIP

[75] Inventor: Nobuya Sinozaki, Yokohama, Japan

[73] Assignee: Kabushiki Kaisha Piolax, Yokohama, Japan

[21] Appl. No.: 623,797

[22] Filed: Mar. 29, 1996

[30] Foreign Application Priority Data

Mar. 30, 1995 [JP] Japan ................. 7-073552

[51] Int. Cl.$^6$ .................... A44B 17/00; F16B 13/04; F16B 21/00
[52] U.S. Cl. ............................. 24/297; 411/510
[58] Field of Search ................. 24/297, 298, 289, 24/453, 563; 411/508, 510, 349, 45, 47, 48, 57, 60

[56] References Cited

U.S. PATENT DOCUMENTS

| | | | |
|---|---|---|---|
| 4,122,583 | 10/1978 | Grittner et al. | 24/297 X |
| 4,176,428 | 12/1979 | Kimura | 24/297 |
| 4,312,614 | 1/1982 | Palmer et al. | 24/297 X |
| 4,778,320 | 10/1988 | Nakama | 24/297 X |
| 5,028,187 | 7/1991 | Sato | 411/60 X |
| 5,085,545 | 2/1992 | Takahashi | 411/45 |
| 5,173,026 | 12/1992 | Cordola et al. | 24/297 X |
| 5,421,067 | 6/1995 | Akachi et al. | 24/297 |
| 5,425,609 | 6/1995 | Smith | 411/60 X |
| 5,509,182 | 4/1996 | Nakanishi | 411/508 X |

*Primary Examiner*—Peter M. Cuomo
*Assistant Examiner*—Robert J. Sandy
*Attorney, Agent, or Firm*—Armstrong, Westerman, Hattori, McLeland & Naughton

[57] ABSTRACT

The object of the present invention is to provide a one-part clip, in low manufacturing cost, exhibiting the excellent function of the two-piece clip and having enough mounting strength without degrading easy repetitive detachability. Hinges 50 that connect a bar portion 30 and a leg portion 40 move so as to widen each elastic portion 43 of the leg portion 40 within the inside of the mounting hole al of the body panel A when the bar portion 30 is moved axially into the inside of the leg portion 40 by forcing the head portion 20 of the clip 10 along axis of the bar portion 30. The engaging portion formed near the end of the bar portion 30 is forced into the engaging hole 42 formed at the top end portion 41 of the leg portion 40 when the bar portion moves axially. If the head portion 20 is pulled strongly to move the bar portion 30 in opposite direction, it can be removed from the body panel A without incurring any damages.

4 Claims, 4 Drawing Sheets

CLIP

BACKGROUND OF THE INVENTION

1. Field of the Invention

This invention relates to the clip, for fastening an attachment to the surface of a plate, which has a head portion which stops above the plate and can fix said attachment to said plate by touching the attachment, a bar portion elongated from said head portion and a leg portion, for engaging with a mounting hole formed on said plate, which is located around said bar portion and is capable of widening and narrowing. The plate is such as a body panel of the automobile or an inner wall of the automobile, and the attachment is such as trim fixed to said body panel.

2. Description of the Prior Art

Many clips about this kind of clip have been proposed, for example, in Japanese Utility Model Laying Open No. Heisei 5 (1993)-83426, Japanese Patent Laying Open No. Heisei 5 (1993)-164120. They have elastic leg portions formed on their head portions by integral molding, and they have problems that their leg portions can cope with only a panel (plate) of given thickness caused by their structure and the leg portions are easily damaged by repetitive use.

To resolve those problems, a clip, the so-called "two-piece clip", is proposed. Also applicant of the present invention has disclosed such clip in the Japanese Patent Laying Open No. Showa 61 (1986)-167708.

The clip disclosed in the Japanese Patent Laying Open No. Showa 61 (1986) 167708 comprises an inserting member and an outer hollow cylinder into which the inserting member is inserted, and when the inserting member is pushed into the outer hollow cylinder after engaging the outer hollow cylinder with an engaging hole of the plate, the diameter of the outer hollow cylinder is enlarged and engages with the engaging hole firmly; furthermore, when the inserting member is pushed more into the outer hollow cylinder, the diameter of the outer hollow cylinder is returned and the cylinder can be detached from engaging hole of the plate.

There are the problems that the operation to mount the inserting member to the outer hollow cylinder requires much time and the manufacturing cost of them are increased because they are produced individually in said prior two-piece clip. Although the diameter of the outer hollow cylinder is enlarged by pushing the inserting member into the outer hollow cylinder, the mounting strength among a plate and them becomes insufficient on some occasions. So the clip is required to be improved its reliability so that it can cope with a certain heavy attachment without degrading easy repetitive detachability and can resist to external force or vibration when it is in used.

SUMMARY OF THE INVENTION

Accordingly, it is an object of the present invention to provide a one-part clip, in low manufacturing cost, exhibiting the excellent function of the two-piece clip and having enough mounting strength without degrading easy repetitive detachability.

To solve the above-mentioned problems, the present invention or a clip is constructed as mentioned hereinafter.

[1]

A clip (10), for fastening an attachment (B) to the surface of a plate (A), having a head portion (20) which stops above the plate (A) and can fix said attachment (B) to said plate (A) a bar portion (30) elongated from said head portion (20) and a leg portion (40), for engaging with a mounting hole (al) formed on said plate (A), which is located around said bar portion (30) and is capable of widening and narrowing, said leg portion (40) has a top end portion (41) having an engaging hole (42) for guiding the end side of said bar portion (30) and at least a pair of elastic portions (43) elongated from said top end portion (41) toward said head portion (20), and said elastic portions (43) are separated from each other by intervening said bar portion (30), said respective elastic portions (43) are connected to said bar portion (30) by hinges (50) possible to move so as to widen said each elastic portion only when the bar portion (30) is forced and moved axially into the inside of the leg portion (40), and an engaging portion (32) which is forced into said engaging hole (42) of the top end portion (41) only when the bar portion (30) is forced into the inside of the leg portion (40) is formed in the end side of said bar portion (30)

[2]

A clip (10) as in claim 1, wherein, a flange (44) for preventing said elastic portion (43) from entering wholly said mounting hole (al) of said plate (A) by engaging with the surrounding portion of the mounting hole (al) of said plate (A) is formed at a free end of each elastic portion (43) of said leg portion (40), and ribs (33) for pressing said respective elastic portions (43) against the surrounding inside of said mounting hole (al) only when the bar portion (30) is forced and moved axially into the inside of the leg portion (40) are formed in the base of said bar portion (30).

To use the clip (10) of the present invention, firstly the leg portion (40) of the clip (10) must be engaged with the mounting hole (al) of said plate (A). In other words, the head portion (20) must be pushed appropriately after setting the top end portion (41) of the leg portion (40) in the mounting hole (al). At this time, respective elastic portions (43) of the leg portion (40) are connected to the bar portion (30) by lying-state hinges (50) and are not yet widened. The inside diameter of the mounting hole (al) of said plate (A) is preset at the size allowing the outer walls of the respective elastic portions (43), in normal condition, to touch the mounting hole (al) appropriately.

Then the head portion (20) of the clip (10) must be pushed more strongly to move axially said bar portion (30) into inside of the leg portion (40). Then, according to the axially move of the bar portion (30) and the leg portion (40), said hinges (50) that connect the bar portion (30) and the leg portion (40) move so that respective elastic portions (43) widen in the mounting hole (al). Thus the respective elastic portions (43) are engaged tightly with the mounting hole (al) of the plate (A) by their elasticity and said hinges' (50) force directs to outward.

Also the engaging portion (32) formed in the end side of said bar portion (30) is forced into said engaging hole (42) of the top end portion (41) when the bar portion (30) is forced into the inside of the leg portion (40). Accordingly, the bar portion (30) never returns to an initial position by some accident since the bar portion (30) and the leg portion (40) are engaged with each other at their end side, and that the leg portion (40) is engaged with the mounting hole (al) of said plate (A) more surely. When the bar portion (30) is forced into the inside of the leg portion (40), the move direction of the bar portion (30) is never shifted from its axial direction because the end side of the bar portion (30) is guided to the engaging hole (42) of the top end portion (41).

When a flange (44) for preventing said whole elastic portion (43) from entering said mounting hole (al) of said plate (A) by engaging with the surrounding portion of the mounting hole (al) of said plate (A) is formed at a free end of each elastic portion (43) of said leg portion (40), only the bar portion (30) can be easily moved axially relative to the leg portion (40) engaged temporarily with plate (A). If the ribs (33) that are pressed and contacted to the inside of said respective elastic portions (43) only when the bar portion (30) is forced and moved axially into the inside of the leg portion (40) is formed in the base of said bar portion (30), also the free end of each elastic portion (43) is pressed strongly against the surrounding inside of said mounting hole (al) of said plate (A), and so stronger mounting strength is obtained.

The attachment (B) is fixed by the head portion (20) which stops above the plate (A); if the clip (10) need to be removed from the plate (A), for example repair of the attachment (B), the bar portion (30) must be pulled outward of the leg portion (40) strongly so that the hinges (50) connecting respective elastic portions (43) and the bar portion (30) return from raised state to lying state relative to the axis of the bar portion (30).

Then the respective elastic portions (43) return to non-widened normal state together with the motion of the hinges (50), and concurrently the engaging portion (32) of the bar portion (30) detaches from the engaging hole (42) of the top end portion (41) of the leg portion (40); therefore, the leg portion (40) can be pulled out from said mounting hole (al) of said plate (A). Thus the clip can cope with a certain heavy attachment without degrading easy repetitive detachability, and the leg portion (40) is not affected strongly by said plate (A) in pulling out the bar portion from the leg portion (40).

DETAILED DESCRIPTION

Figure 1:
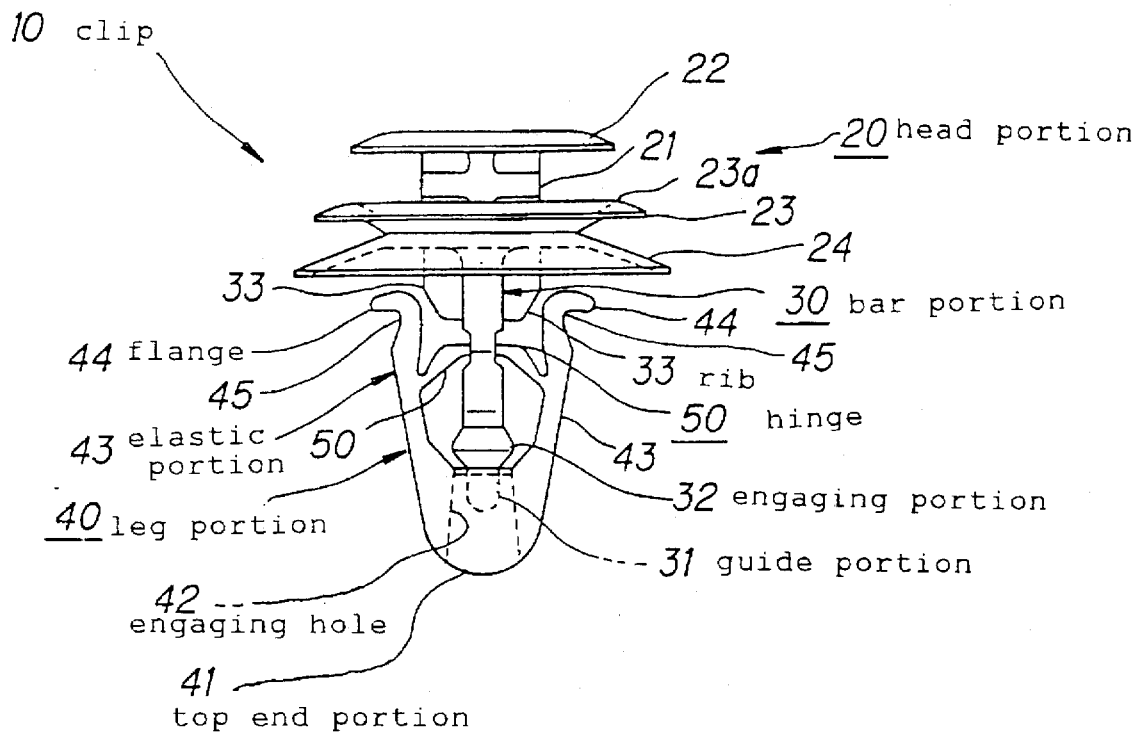
FIG. 1 is a front view showing the clip of the first embodiment of the present invention.

The various embodiments of the present invention are shown in the drawings.

The first embodiment of the present invention is shown in FIGS. 1~6.

A clip 10 of this embodiment is a member for fixing an attachment or a decorating plate B such as inside trim for an automobile to the surface of the plate such as a body panel A of the automobile or an inner wall of the automobile.

Figure 2:
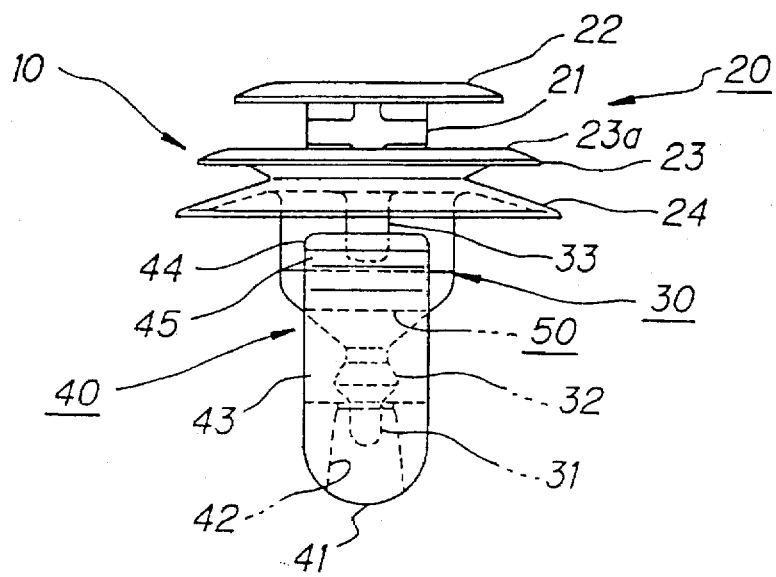
FIG. 2 is a side view showing the clip of the first embodiment of the present invention.
Figure 3:
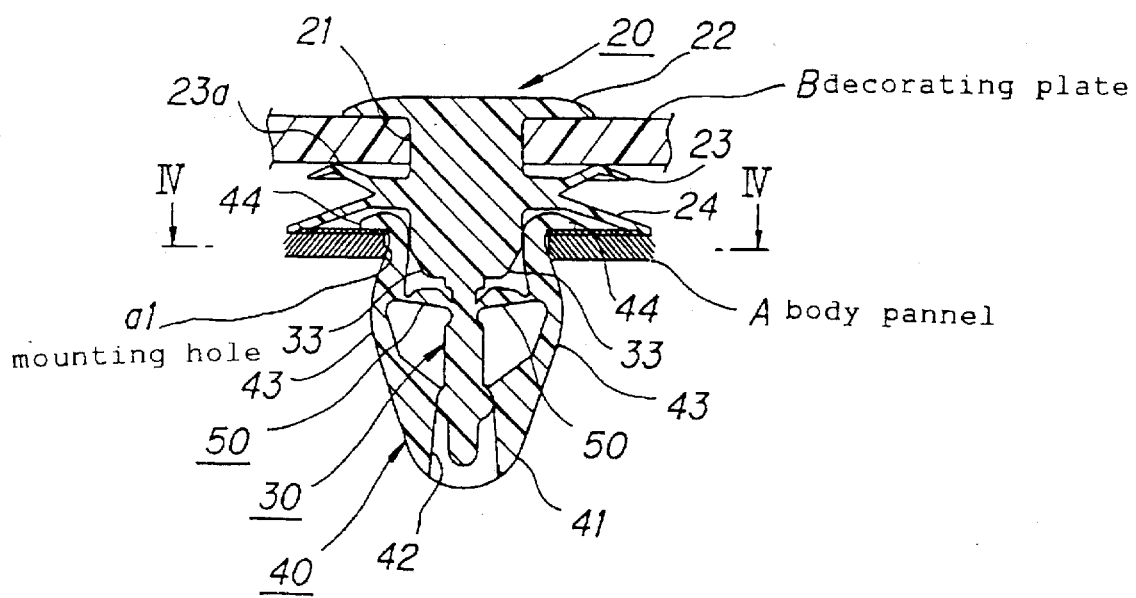
FIG. 3 is a sectional view showing the clip of the first embodiment of the present invention mounting a decorating plate on a body panel.
Figure 4:
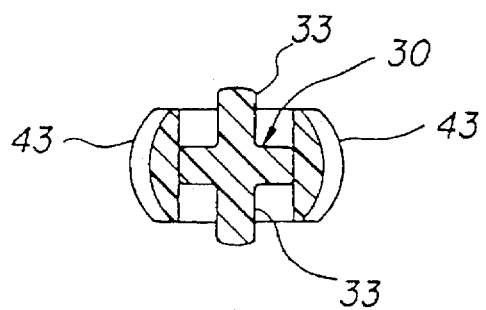
FIG. 4 is a sectional view taken substantially along the lines IV—IV of FIG. 3.
Figure 5:
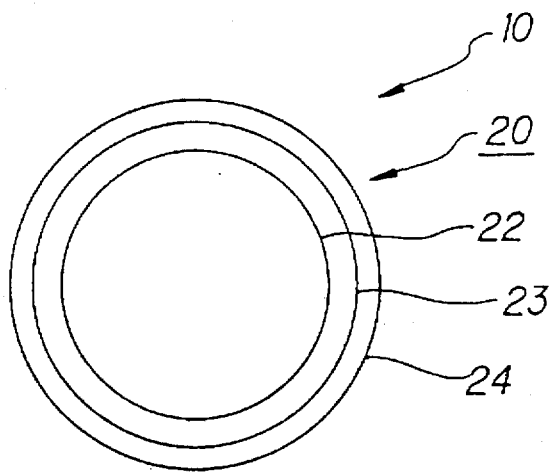
FIG. 5 is a plan view showing the clip of the first embodiment of the present invention.
Figure 6:
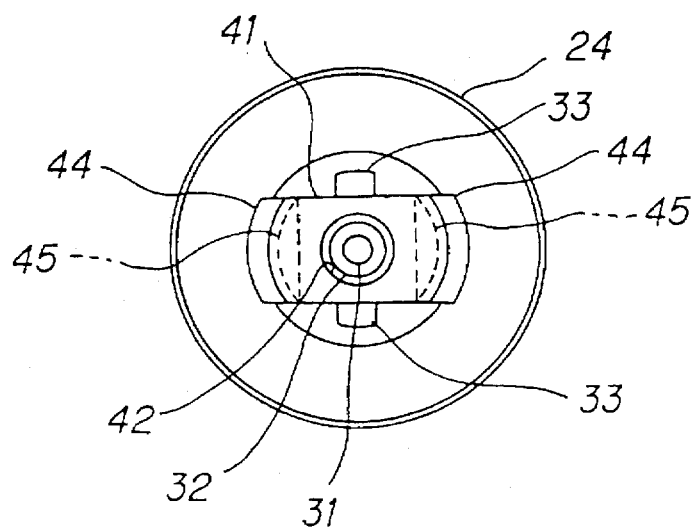
FIG. 6 is a bottom view showing the clip of the first embodiment of the present invention.

Such clip 10, as shown in FIGS. 1~3, comprises a head portion 20 which stops above the body panel A and can fix said attachment or the decorating plate B to said body panel A, a bar portion 30 elongated from the center of the underside of said head portion 20 and a leg portion 40, for engaging with a mounting hole al formed on said body panel A, which is located around said bar portion 30 and is capable of widening and narrowing. The clip 10 is molded integrally from synthetic resin such as polyamide resin and polyacetal resin.

Said head portion 20 consists of a disk type head flange 22 which is formed near the top end of the axis portion 21 and whose center surface is perpendicular to the axis portion 21, an intermediate flange 23 formed under the head flange 22 parallel to it and a seal flange 24 formed under the intermediate flange 23 parallel to it. The diameter of each flange 22~24 is larger than above the flange. The head flange 22 and the intermediate flange 23 are spaced so that the decorating plate B can be sandwiched between them. A peripheral portion of the intermediate flange 23 is directed obliquely to the upper and then bent downward obliquely, thereby forming a thin contacting portion 23a which comes in elastically contact with the under surface of the decorating plate B. Each central portion of the seal flange 24 and the intermediate flange 23 is in closely contact with each other. A peripheral portion of the seal flange 24 is directed downward obliquely so as to be in closely contact with the surface of the body panel A.

Said bar portion 30 elongates downward from the undersurface center of the seal flange 24 of the head portion 20 along to the axis of the axis portion 21. Although the base of the bar portion 30 is formed like a board, the end side is tapered at end. Tapered ribs 33 are formed perpendicular to the side of the base of the bar portion 30. On the other hand, the top end of the bar portion 30 is a guide portion 31 which is introduced into the engaging hole 42 of the leg portion 40 which will be mentioned hereinafter, and a larger diameter engaging portion 32 is formed in a slightly higher position. The operation of the ribs 33 and/or the engaging portion 32 will be mentioned hereinafter.

The leg portion 40 has a top end portion 41 which has the engaging hole 42 for guiding the end side of said bar portion 30 or the guide portion 31 and a pair of elastic portions 43 elongated from said top end portion 41 toward said head portion 20, and said elastic portions 43 are separated from each other by intervening said bar portion 30. The top end portion 41 is tapered so that it can be introduced into the mounting hole al formed on the body panel A. The diameter of the narrowest portion of the engaging hole 42 is large enough so that the engaging portion 32 of said bar portion 30 can be forced into there.

Each elastic portion 43 is widened and elongated outward from the top end portion 41 to the head portion 20, and their outer walls are formed like an arc whose center is in the axis of the bar portion 30. The diameter of the circle including the outer wall of each elastic portion 43 is the size suitable for engaging easily with the mounting hole al formed on the body panel A. A constricted part 45 is formed around outer wall of the free end of each elastic portion 43; furthermore, a flange 44 for preventing said elastic portion 43 from entering wholly said mounting hole al of the body panel A by engaging with the surrounding portion of the mounting hole al of the panel A is formed at said free end. Said constricted part 45 can just engage with the surrounding inside of said mounting hole al of the panel A.

The respective elastic portions 43 are connected to said bar portion 30, nearby their middle portions, by hinges 50 possible to move so as to widen said each elastic portion 43 only when the bar portion 30 is forced and moved axially into the inside of the leg portion 40. In the state before use, as shown in FIG. 1, the hinges 50 elongates downward obliquely from the middle portion of the bar portion 30 and are connected with inner wall of said each elastic portion 43, and when the bar portion 30 moves into inside of the leg portion 40, as shown in FIG. 3, said hinges 50 that connect the bar portion 30 with the leg portion 40 move so as to widen the leg portion 40 within the mounting hole a1.

Each elastic portion 43 is connected to the bar portion 30 by said hinges 50. The bar portion 30 and the leg portion 40 are molded integrally as single part via hinges 50 so as to move axially. Although the elastic portions 43 are paired in this embodiment, they may be made in two pairs or more pairs corresponding to the load and/or the mounting strength.

The operation of the first embodiment will be explained next.

To use the clip 10, firstly stop the head portion 20 above the decorating plate B. The decorating plate B has mounting holes (not shown in Figures.). The mounting hole comprises a pair of a large hole where the head flange 22 can through there and a little hole where the head flange 22 cannot through there communicated with each other by a slit. The head flange 22 is fixed tightly to the decorating plate B by moving its axis portion 21 to the little hole after inserting into the large hole. As shown in FIG. 3, the decorating plate B is sandwiched between the head flange 22 and the intermediate flange 23. The thin contacting portion 23a comes in elastically contact with the back side of the decorating plate B.

Before the decorating plate B is mounted on the body panel A, the leg portion 40 of the clip 10 must be engaged with the mounting hole a1 of the body panel A. In other words, the top end portion 41 of the leg portion 40 must be inserted into the mounting hole a1 and pushed appropriately. At this time, respective elastic portions 43 of the leg portion 40 are connected to the bar portion 30 by lying-state hinges 50 and are in the normal state or not yet widened.

Even if the leg portion 40 is pushed further towards the mounting hole a1, the flange 44 of each elastic portion 43 of the leg portion 40 is caught on the outer surface of the mounting hole a1; therefore, the leg portion 40 cannot enter further into the mounting hole a1. At this time, the constricted part 45 of each elastic portion 43 is just engaged with the inner edge of the mounting hole a1. In this state, if the head portion 20 is pushed further axially with the decorating plate B, the bar portion 30 elongated from the head portion 20 moves axially into the inside of the leg portion 40.

Then, according to the axially move of the bar portion 30 and the leg portion 40, said hinges 50 that connect the bar portion 30 and the leg portion 40 move so that respective elastic portions 43 widen in the mounting hole a1. Thus the respective elastic portions 43 are engaged tightly with the mounting hole a1 of the plate A by their elasticity and said hinges' 50 force directs to outward.

Also the engaging portion 32 formed in the end side of said bar portion 30 is forced into the engaging hole 42 of the top end portion 41 when the bar portion 30 is forced into the inside of the leg portion 40.

As shown in FIG. 3, the diameter of the inlet of the engaging hole 42 is slightly less than the outside diameter of the engaging portion 32, and the inner surface shape of the engaging hole 42 is similar to the spherical engaging portion 32; therefore, once inserted into the engaging hole 42, the engaging portion 32 is not pulled out easily from the engaging hole 42, and so the engaging state is maintained.

Accordingly, the bar portion 30 never returns to an initial position by some accident since the bar portion 30 and the leg portion 40 are engaged with each other at their end side, and that the leg portion 40 is engaged with the mounting hole a1 of said body panel A more surely. When the bar portion 30 is forced into the inside of the leg portion 40, the move direction of the bar portion 30 is never shifted from its axial direction because the guide portion 31 the bar portion 30 is guided to the engaging hole 42. Furthermore, the decorating plate B is fixed at the constant height from the body panel A by engaging the engaging portion 32 with the engaging hole 42.

Furthermore, as shown in FIG. 3, ribs 33 formed in the base of said bar portion 30 push the inner wall of each elastic portion 43 and can engage with the free end of each widened elastic portion 43 with the surrounding inside of the mounting hole a1, and that they can prevent each elastic portion 43 from returning to inside. Since the seal flange 24 is pressed to the surface of the body panel A when the clip 10 is used as above description, water and/or a noise cannot penetrate through the base of the bar portion 30 into inside.

On the other hand, if the clip 10 need to be removed from the body panel A, for example repair of the decorating plate B, it is recommended that the head portion 20 be pulled together with the decorating plate B by the force stronger than the catching force between the engaging portion 32 of the bar portion 30 and the engaging hole 42 of the leg portion 40. Then the catching state is released, and that the hinges 50 which connect respective elastic portions 43 and the bar portion 30 return from raised state to lying state relative to the axis of the bar portion 30 and draw each elastic portions 43 toward the axis; therefore, the respective elastic portion 43 return to nonwidened normal state. Thus, the leg portion 40 can be pulled out easily from the mounting hole a1 of the body panel A.

When the decorating plate B need to be mounted on the body panel A, above-mentioned operation is repeated. In a sequence of above-mentioned operation of the clip 10, the means for fixing the decorating plate B on the body panel A contacts each elastic portion 43 of the leg portion 40 to the mounting hole a1 by widening each elastic portion 43 by means of the hinges 50, and the decorating plate B is fixed axially by the catching force between the engaging portion 32 and the engaging hole 42; therefore, the clip 10 is invulnerable to the press mold flash and/or the corner of the body panel in spite of repetitive use. Furthermore, the clip 10 can cope with body panels of various thickness because elastic portions 43 of the leg portion 40 is pressed against the mounting hole a1.

Figure 7:
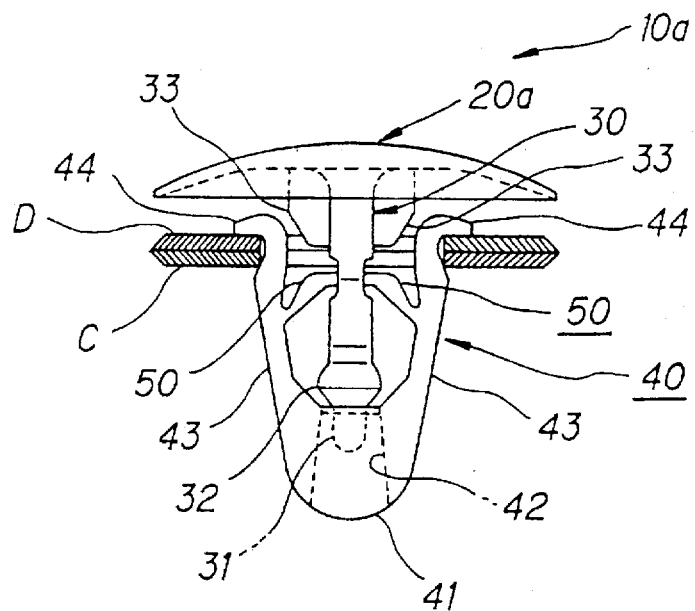
FIG. 7 is a sectional view showing the clip of the second embodiment of the present invention engaged with a decorating plate and a body panel temporarily
Figure 8:
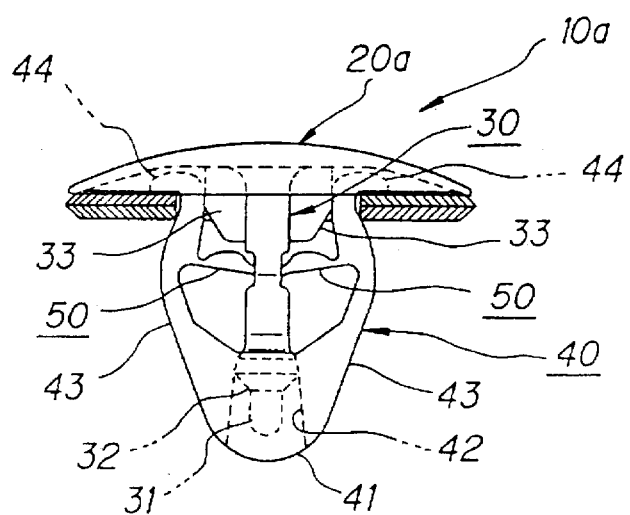
FIG. 8 is a sectional view showing the clip of the second embodiment of the present invention mounting the decorating plate on the body panel.

The second embodiment of the present invention is shown in FIGS. 7 and 8.

Although the clip 10a of the present embodiment has a bar portion 30, a leg portion 40 and hinges 50 that are common to those of said first embodiment, a head portion 20a is different from those of the first embodiment. Furthermore, a body panel C and a decorating plate D are also different from those of the first embodiment.

As shown in FIGS. 7 and 8, the head portion 20a of the clip 10a stops on the decorating plate D over the body panel C; therefore, it can see from the outside. The head portion 20a consists of a flange like an spread umbrella formed at the base of the bar portion 30.

To use the clip 10a, it is recommended that the decorating plate D are laid on the body panel C so as to match their mounting holes one another before the head portion 20a of the clip 10a is pushed toward the mounting hole so that the leg portion 40 of the clip 10a can be engaged with both of the mounting holes of the body panel C and the decorating plate D. Then, as shown in FIG. 7, the constricted part 45 of each elastic portion 43 is just engaged with both of the inner edges of the mounting holes of the body panel C and the decorating plate D.

In this state, if the head portion 20a is pushed further axially with the decorating plate D, the bar portion 30 elongated from the head portion 20a moves axially into the inside of the leg portion 40, and that the leg portion 40 engages with the body panel C reliably and tightly as in the case of the first embodiment; furthermore, in the case of the present embodiment, the leg portion 40 also engages with the decorating plate D, and the decorating plate D is forced to the body panel C by the head portion 20a so as to contact firmly.

According to the clip of the present invention, since respective elastic portions of the leg portion are widened within the mounting hole of the plate and the engaging portion of the leg portion is forced into the engaging hole formed at the top end portion of the leg portion, the clip can be molded one part; therefore, it can be provided in the low manufacturing cost with exhibiting the excellent function of the two-piece clip and having enough mounting strength without degrading easy repetitive detachability.

What is claimed is:

1. A clip for fastening an attachment to the surface of a plate comprising:

a head portion stopping above the plate and being capable of fixing said attachment to said plate;

a bar portion elongating from said head portion; and a leg portion, for engaging with a mounting hole formed on said plate, said leg portion having a top end portion formed with an engaging hole for guiding the end side of said bar portion and at least a pair of elastic portions elongating from said top end portion toward said head portion, said elastic portions being separated from each other by said bar portion, said respective elastic portions being connected to said bar portion at a middle portion thereof by hinges capable of moving so as to widen said each elastic portion only when the bar portion is forced and moved axially into the inside of the leg portion, and the end side of said bar portion being formed with an engaging portion which is forced into said engaging hole of the top end portion only when the bar portion is forced into the inside of the leg portion.

2. A clip for fastening an attachment to the surface of a plate comprising:

a head portion stopping above the plate and being capable of fixing said attachment to said plate;

a bar portion elongating from said head portion; and a leg portion, for engaging with a mounting hole formed on said plate, said leg portion having a top end portion formed with an engaging hole for guiding the end side of said bar portion and at least a pair of elastic portions elongating and widening from said top end portion toward said head portion, said elastic portions being separated from each other by said bar portion and being formed with flanges and narrowing portions at free ends thereof for supporting the plate, said respective elastic portions being connected to said bar portion at a middle portion thereof by hinges capable of moving so as to widen said each elastic portion only when the bar portion is forced and moved axially into the inside of the leg portion, and the end side of said bar portion being formed with an engaging portion which is forced into said engaging hole of the top end portion only when the bar portion is forced into the inside of the leg portion.

3. A clip for fastening an attachment to the surface of a plate as claimed in claim 2, wherein said hinges are positioned in the top end portion side forward the beginnings of the narrowing portions.

4. A clip for fastening an attachment to the surface of a plate as claimed in claim 1, 2 or 3, wherein the thicknesses of the connected portions to the bar portion and the elastic portions are thinner than that of the middle portions of said hinges.

* * * * *